(12) United States Patent
Takahashi

(10) Patent No.: US 8,837,059 B2
(45) Date of Patent: Sep. 16, 2014

(54) IMAGE READING APPARATUS

(75) Inventor: Kaoru Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 143 days.

(21) Appl. No.: 13/357,278

(22) Filed: Jan. 24, 2012

(65) Prior Publication Data

US 2013/0070349 A1    Mar. 21, 2013

(30) Foreign Application Priority Data

Sep. 15, 2011   (JP) ................................. 2011-201908

(51) Int. Cl.
*G02B 17/00* (2006.01)
*G02B 26/08* (2006.01)
*G02B 26/10* (2006.01)
*G02B 5/04* (2006.01)
*G03G 15/00* (2006.01)

(52) U.S. Cl.
CPC .... *G03G 15/605* (2013.01); *G03G 2215/00189* (2013.01); *G03G 2215/00194* (2013.01); *G02B 5/04* (2013.01); *G03G 2215/00185* (2013.01)
USPC ........................................ 359/730; 359/201.2

(58) Field of Classification Search
USPC .................... 359/730, 201.1, 201.2
See application file for complete search history.

(56) References Cited

U.S. PATENT DOCUMENTS 4,876,570 A  * 10/1989 Iwaya ............................. 399/14
7,557,969 B2 *  7/2009 Sone ............................. 358/504

FOREIGN PATENT DOCUMENTS

JP    2010-41445 A    2/2010
JP    2011-24041 A    2/2011

* cited by examiner

*Primary Examiner* — Alicia M Harrington
(74) *Attorney, Agent, or Firm* — Sughrue Mion, PLLC

(57) ABSTRACT

According to an aspect of the invention, an image reading apparatus includes a substrate, light emitting elements, a catoptrics system, an imaging lens, a lens position fixing unit, and a reflective surface fixing unit. The plurality of light emitting elements is arranged on the substrate in a line and emits light to a surface of an object to be irradiated. The imaging element is disposed on the substrate and receives light reflected from the surface of the object. The first optical system guides the light emitted from the light emitting elements to the surface of the object. The second optical system guides the light reflected from the surface to the imaging element. The second optical system includes a catoptrics system including a first reflective surface and a second reflective surface so that light reflected from the first reflective surface is reflected to the substrate, and an imaging lens.

10 Claims, 8 Drawing Sheets

IMAGE READING APPARATUS

CROSS-REFERENCE TO RELATED APPLICATIONS

This application is based upon and claims priority under 35 USC 119 from Japanese Patent Application No. 2011-201908, filed Sep. 15, 2011.

BACKGROUND

Technical Field

The present invention relates to an image reading apparatus.

SUMMARY OF THE INVENTION

According to an aspect of the invention, an image reading apparatus includes a substrate, a plurality of light emitting elements, a catoptrics system, an imaging lens, a lens position fixing unit, and a reflective surface fixing unit. The plurality of light emitting elements is arranged on the substrate in a line and emits light to a surface of an object to be irradiated. The imaging element is disposed on the substrate and receives light reflected from the surface of the object. The first optical system guides the light emitted from the plurality of light emitting elements to the surface of the object. The second optical system guides the light reflected from the surface to the imaging element. The second optical system includes a catoptrics system including a first reflective surface on which the light reflected from the surface is incident and a second reflective surface disposed to be 90° with respect to the first reflective surface so that light reflected from the first reflective surface is reflected to the substrate, and an imaging lens being disposed on an optical path between the imaging element and the second reflective surface and configured to form an image of light on the imaging element. The lens position fixing unit is configured to adjust a position of the imaging lens in an optical axis direction of the imaging lens and fixes the imaging lens. The reflective surface fixing unit is configured to adjust a position of the second reflective surface in an optical axis direction of light reflected from the second reflective surface and in an optical axis direction of light incident on the second reflective surface and fixes the reflective surface.

BRIEF DESCRIPTION OF THE DRAWINGS

Exemplary embodiments of the invention will be described in detail based on the following figures, wherein.

DETAILED DESCRIPTION

Figure 1:
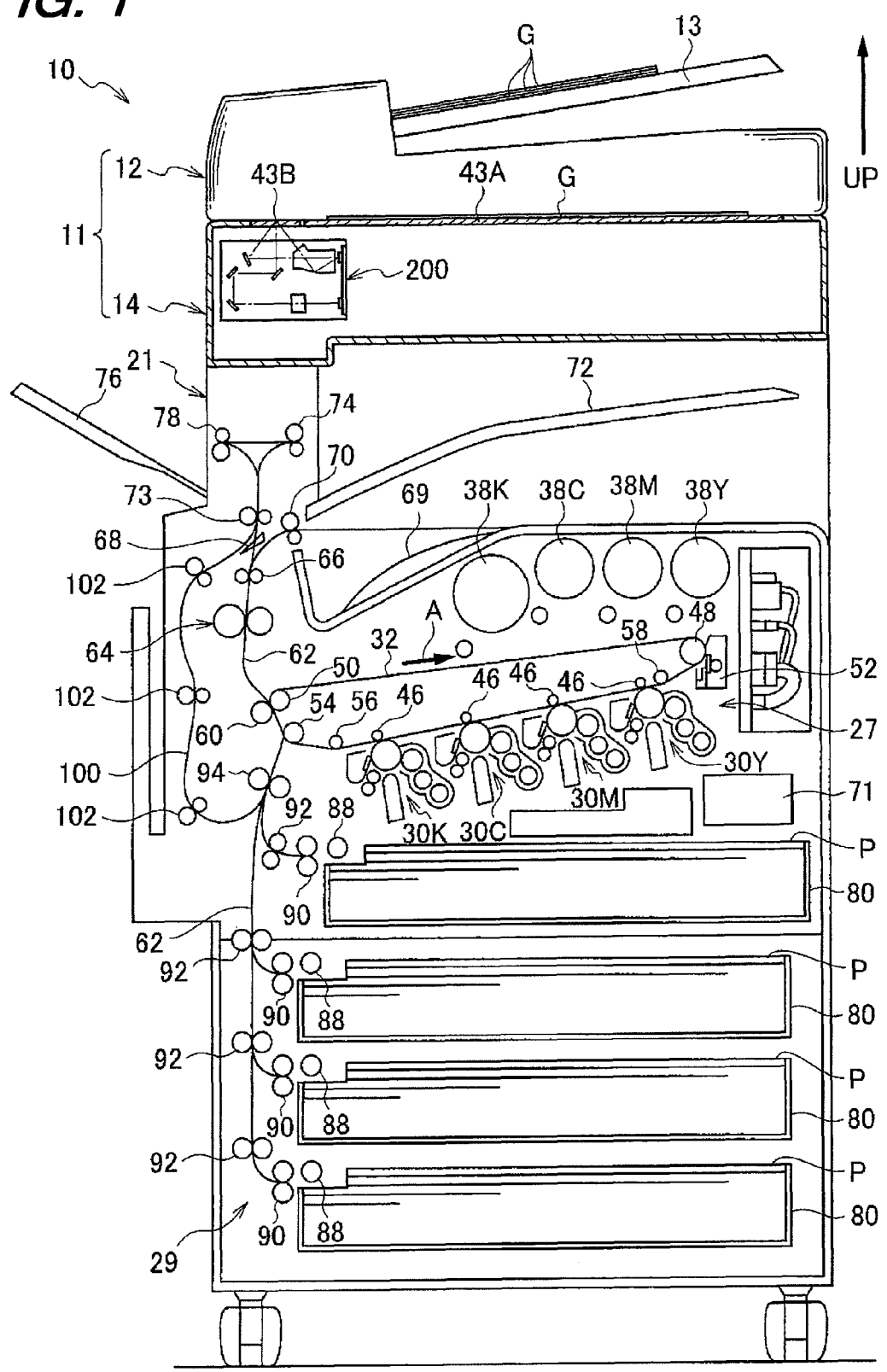
FIG. 1 is a schematic view illustrating an entire configuration of an image forming apparatus according to a present embodiment.

Hereinafter, an exemplary embodiment of the present invention will be described based on the drawings. An arrow UP illustrated in the drawing represents a vertically upward direction.

<Summary of Configuration of Image Forming Apparatus According to Embodiment>

First, a summary of a configuration of an image forming apparatus according to an exemplary embodiment will be described.

As illustrated in FIG. 1, an image forming apparatus 10 according to the exemplary embodiment includes an image reading apparatus 11 configured to read an image of a document G, and an image recording apparatus 21 configured to record an image on a recording medium P such as a recording paper. The image reading apparatus 11 is disposed at an upper part of the image forming apparatus 10, and the image recording apparatus 21 is disposed at a lower part of the image forming apparatus 10. The image reading apparatus 11 is configured to read the image of the document G and convert the read image into an image signal. The image recording apparatus 21 is configured to record an image on the recording medium P based on the image signal converted by the image reading apparatus 11.

<Configuration of Image Recording Apparatus 21 According to Embodiment>

First, the configuration of the image recording apparatus 21 according to the present embodiment will be described.

As illustrated in FIG. 1, the image recording apparatus 21 includes a plurality of recording medium receiving modules 80 configured to receive a recording medium P such as a paper, an image forming module 27 configured to form an image on the recording medium P, and a conveying module 29 configured to convey the recording medium P from the plurality of recording medium receiving modules 80 to the image forming module 27. The image recording apparatus 21 also includes a first ejecting module 69, a second ejecting module 72 and a third ejecting module 76 each configured to eject the recording medium P on which an image is recorded by the image forming module 27, and a controlling module 71 configured to control the operations of the respective modules of the image recording apparatus 21.

The image forming module 27 includes image forming units 30Y, 30M, 30C, and 30K configured to form toner images of yellow (Y), magenta (M), cyan (C) and black (K) colors, an intermediate transfer belt 32 as an example of an intermediate transfer body to which the toner images formed by the image forming units 30Y, 30M, 30C, and 30K are transferred, a first transfer roller 46 as an example of a first transfer member configured to transfer the toner images formed by the image forming units 30Y, 30M, 30C, and 30K to the intermediate transfer belt 32, a second transfer roller 60 as an example of a second transfer member configured to transfer the toner images, which are transferred to the intermediate transfer belt 32 by the first transfer roller 46, from the intermediate transfer belt 32 to the recording medium P, and a fixing device 64 configured to fix the toner images, which are transferred from the intermediate transfer belt 32 to the recording medium P by the second transfer roller 60, on the recording medium P.

The image forming units 30Y, 30M, 30C, and 30K are arranged side by side at the vertically center part of the image recording apparatus 21, with being inclined with respect to a horizontal direction.

Figure 2:
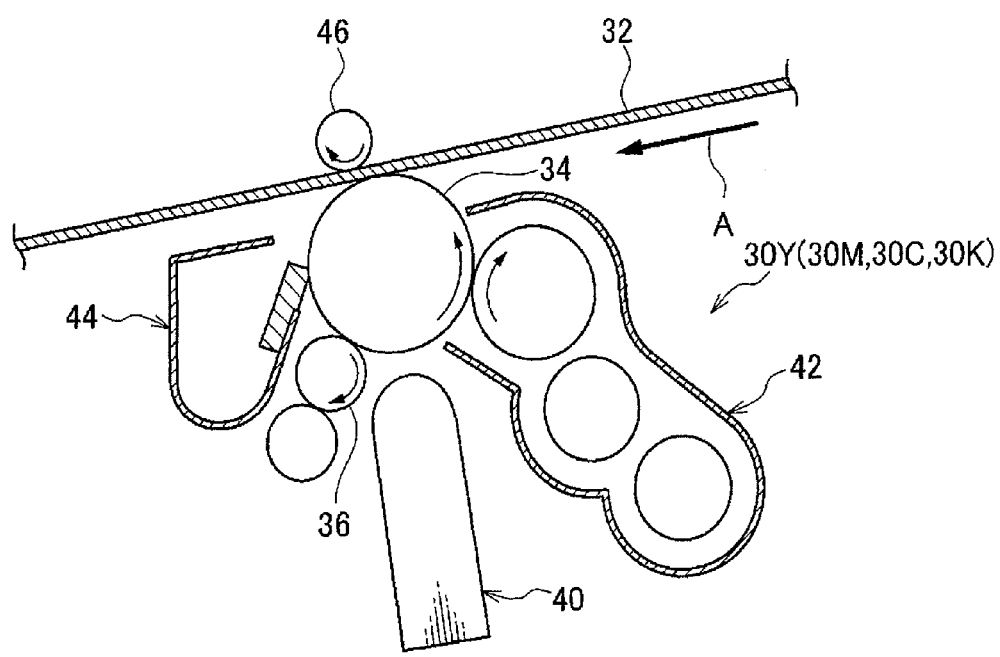
FIG. 2 is a schematic view illustrating a configuration of an image forming unit according to the present embodiment.

As illustrated in FIG. 2, each of the image forming units 30Y, 30M, 30C, and 30K is an image holding body configured to hold a formed toner image and has a photosensitive drum 34 configured to rotate in a one direction (counterclockwise direction in FIG. 1).

In the vicinity of each photosensitive drum 34, a charging equipment 36 configured to charge the photosensitive drum 34, an exposure equipment 40 configured to form an electrostatic latent image by exposing the photosensitive drum charged by the charging equipment 36, a development equipment 42 configured to form a toner image by developing the electrostatic latent image formed on the photosensitive drum 34 by the exposure equipment 40, and a removal equipment configured to remove a toner remaining on the photosensitive drum 34 after the toner image formed on the photosensitive drum 34 is transferred to the intermediate transfer belt 32, are installed sequentially from a rotational-direction upstream side of the photosensitive drum 34.

The exposure equipment 40 is configured to form an electrostatic latent image based on an image signal transmitted from the controlling module 71 (see FIG. 1). As an image signal transmitted from the controlling module 71, there is an image signal generated in the image reading apparatus 11 or an image signal acquired from an external apparatus by the controlling module 71.

As illustrated in FIG. 1, the intermediate transfer belt is disposed above the image forming units 30Y, 30M, 30C, and 30K. The intermediate transfer belt 32 is wound with a predetermined tensile force around a driving roller 48 configured to apply a driving force to the intermediate transfer belt 32, an opposed roller 50 opposed to the second transfer roller 60, a tensile force applying roller 54 configured to apply a tensile force to the intermediate transfer belt 32, a first driven roller 56, and a second driven roller 58. The intermediate transfer belt 32 is configured to be applied with a torque by the driving roller 48 and cyclically move in a one direction (A direction in FIG. 1) while being in contact with the photosensitive drum 34.

At an opposed position facing the driving roller 48, with the intermediate transfer belt 32 being disposed therebetween, the removal equipment 52 configured to remove the toner remaining in the intermediate transfer belt 32 is installed. Above the intermediate transfer belt 32, toner cartridges 38Y, 38M, 38C and 38K configured to retain the respective colors of toners supplied to the development equipments 42 for the respective yellow (Y), magenta (M), cyan (C), and black (K) colors are installed.

The first transfer roller 46 faces the photosensitive drum 34, with the intermediate transfer belt 32 being disposed therebetween. An area between the first transfer roller 46 and the photosensitive drum 34 is a first transfer position at which the toner image formed on the photosensitive drum 34 is transferred to the intermediate transfer belt 32.

The second transfer roller 60 faces the opposed roller 50, with the intermediate transfer belt 32 being disposed therebetween. An area between the second transfer roller 60 and the opposed roller 50 is a second transfer position at which the toner image transferred to the intermediate transfer belt 32 is transferred to the recording medium P.

In the conveying module 29, a delivering roller 88 configured to deliver the recording medium P received in each of the recording medium receiving modules 80, a conveying path through which the recording medium P delivered by the delivering roller 88 is conveyed, and conveying rollers 90, 92 and 94 disposed along the conveying path 62 and configured to convey the recording medium P delivered by the delivering roller 88 to the second transfer position, are installed.

The fixing device 64 is disposed at a conveying-direction of downstream side as compared with the second transfer position and fixes the toner image transferred to the second transfer position on the recording medium P.

At a conveying-direction downstream side as compared to the fixing device 64, a conveying roller 66 configured to convey the recording medium P, on which the toner image is fixed, is installed. At a conveying-direction downstream side of the conveying roller 66, a switching member 68 configured to switch the conveying direction of the recording medium P is installed. At a conveying-direction downstream side of the switching member 68, a first ejecting roller 70 configured to eject the recording medium P conveyed to one side (right side in FIG. 1) of the conveying direction switched by the switching member 68 to the first ejecting module 69 is installed.

At a conveying-direction downstream side of the switching member 68, a conveying roller 73 configured to convey the recording medium P conveyed to other side (upper side in FIG. 1) of the conveying direction switched by the switching member 68, a second ejecting roller 74 configured to eject the recording medium P conveyed by the conveying roller to the second ejecting module 72, and a third ejecting roller 78 configured to eject the recording medium P conveyed by the conveying roller 73 to the third ejecting module 76.

At a lateral side of the fixing device 64, an inverted conveying path 100, through which the recording medium P inverted by reversely rotating the conveying roller 73 is conveyed, is formed. A plurality of conveying rollers 102 are installed in and along the inverted conveying path 100. The recording medium P conveyed by the conveying rollers 102 is again sent to the second transfer position by the conveying roller 94.

Next, an image forming operation that forms an image on a recording medium P in the image recording apparatus 21 according to the present embodiment will be described.

In the image recording apparatus 21 according to the present embodiment, a recording medium P delivered from any one of the plurality of recording medium receiving modules 80 is sent to the second transfer position by the conveying rollers 90, 92, and 94.

Meanwhile, in the image forming units 30Y, 30M, 30C, and 30K, the exposure equipment 49 forms electrostatic latent images on the photosensitive drum 34, based on an image signal acquired from the image reading apparatus 11 or an external apparatus, and toner images are formed based on the electrostatic latent image. The toner images of the respective colors formed by the image forming units 30Y, 30M, 30C, and 30K are overlapped on the intermediate transfer belt 32 at the first transfer position and become a color image. The color image formed on the intermediate transfer belt 32 is transferred on the recording medium P at the second transfer position is transferred.

The recording medium P, to which the toner images are transferred, is conveyed to the fixing device 64, and the transferred toner images are fixed by the fixing device 64. In the case of forming an image on only one surface of the recording medium P, the toner images are fixed and then the recording medium P is ejected to any one of the first ejecting module 69, the second ejecting module 72, and the third ejecting module 76.

In the case of forming images on both surfaces of the recording medium P, an image is formed on one surface of the recording medium P and then the recording medium P is inverted by the conveying roller 73 and is sent to the inverted conveying path 100. The recording medium P is again sent to the second transfer position from the conveying path 100 by the conveying roller 94. As described above, an image is formed on an opposite surface side of the recording medium P. Thus, the images are formed on both surfaces of the recording medium P. As above, a series of image forming operations are performed.

The configuration of the image recording apparatus 21 is not limited to the above-described configuration. For example, the image recording apparatus 21 may be a direct transfer type having no intermediate transfer body or an image recording apparatus using an inkjet method. The image recording apparatus 21 may be any image recording apparatus having a configuration other than the above-described configurations as long as it can record an image.

<Configuration of Image Reading Apparatus 11 According to Present Embodiment>

Next, the configuration of the image reading apparatus 11 will be described.

Figure 3:
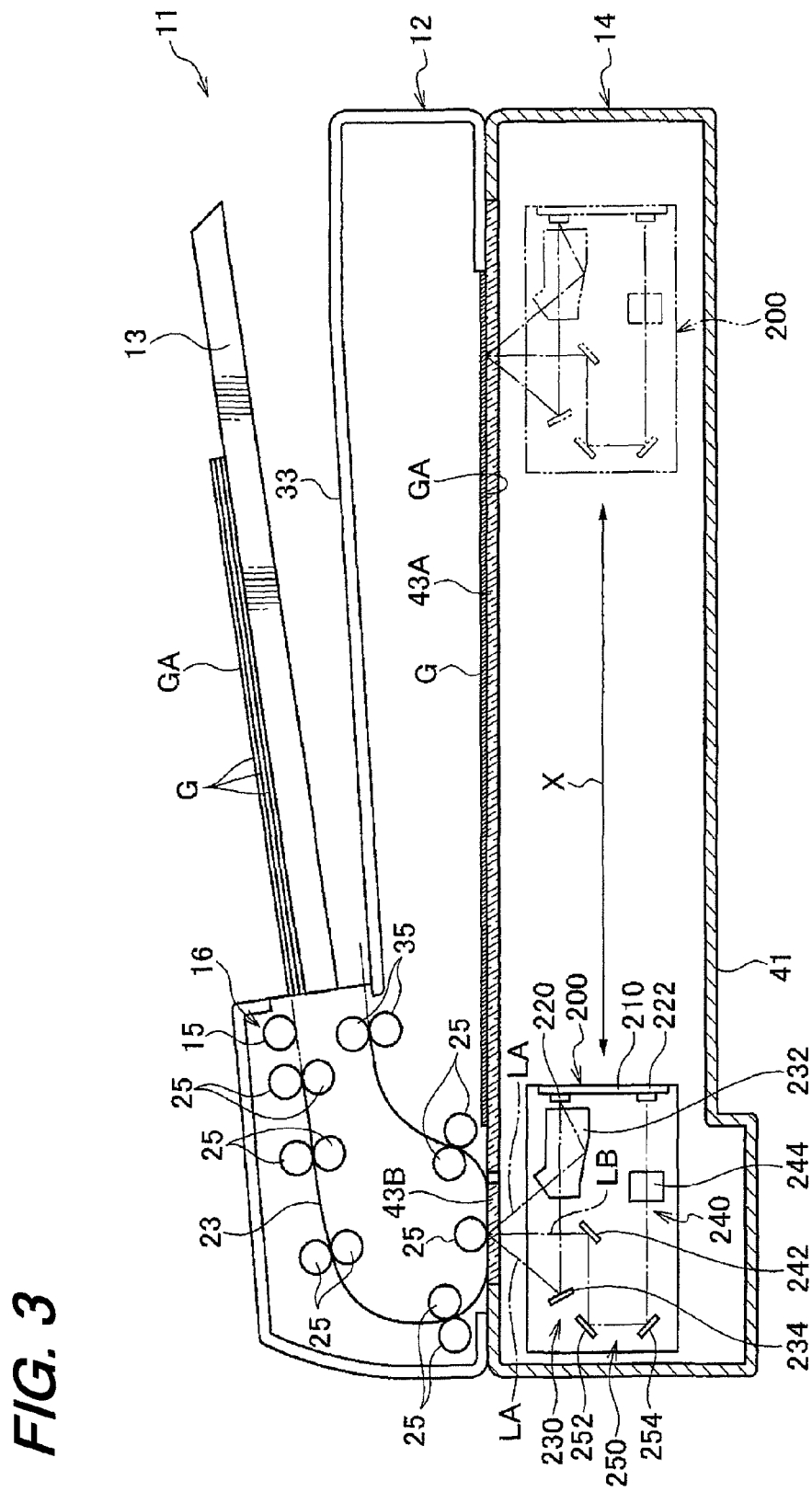
FIG. 3 is a schematic view illustrating a configuration of an image reading apparatus according to the present embodiment.

As illustrated in FIG. 3, the image reading apparatus 11 is provided with a document conveying device 12 configured to convey a document G, and an image reading module 14 configured to read an image of the document G. The document conveying device 12 is disposed at an upper part of the image reading apparatus 11, and the image reading module 14 is disposed at a lower part of the image reading apparatus 11.

The document conveying device 12 is provided with a document receiving module 13 configured to receive the document G, a document ejecting module 33 configured to eject the document G, and a conveying module 16 configured to convey the document G from the document receiving module 13 to the document ejecting module 33.

The conveying module 16 is configured by a delivering roller 15 configured to deliver the document G received in the document receiving module 13, a plurality of conveying rollers configured to convey the document G delivered by the delivering roller 15 to a conveying-direction downstream side, and an ejecting roller 35 configured to eject the document G conveyed by the conveying roller 25 to the document ejecting module 33. The plurality of conveying rollers 25 and the ejecting roller 35 are disposed along a folding-shaped conveying path 23 through which the document G delivered from the document receiving module 13 is conveyed.

The image reading module 14 is configured to read the images of both of the document G conveyed by the document conveying device 12 and the document G loaded on a first platen glass 43A, and is provided with a case 41 configured to receive the respective constituent parts.

Above the case 41, the first platen glass 43A, on which the document G is loaded and which transmits light L for reading out the image of the loaded document G, and a second platen glass 43B, which transmits light L for reading out the image of the document G conveyed by the document conveying device 12, are installed.

The document conveying device 12 is attached openably and closably to the image reading module 14. When the document conveying device 12 is in an open state, the document G is loaded on the first platen glass 43A.

The image reading module 14 is provided with a reading unit 200 (see FIG. 4) configured to irradiate light L (irradiated light LA to be described later) on a surface to be read GA of the document G (image surface on which an image is formed) and read an optical image by guiding light L reflected from the surface to be read GA of the document G (reflected light LB to be described later) after the light L is irradiated on the surface to be read GA of the document G.

The reading unit 200 is configured to be movable in a direction of an arrow X (sub scanning direction X to be described later) and read the image of the surface to be read GA of the document G loaded on the first platen glass 43A while moving in the direction of the arrow X.

Meanwhile, in the case of reading the image of the surface to be read (image surface) GA of the document G conveyed by the document conveying device 12, the reading unit 200 stops at a reading position of a solid line illustrated in one end portion of the image reading module 14 (left end portion in FIG. 3). While the document G is passing through the reading position of the second platen glass 43B, the image of the surface to be read GA of the document G is read (see FIG. 4).

Figure 8:
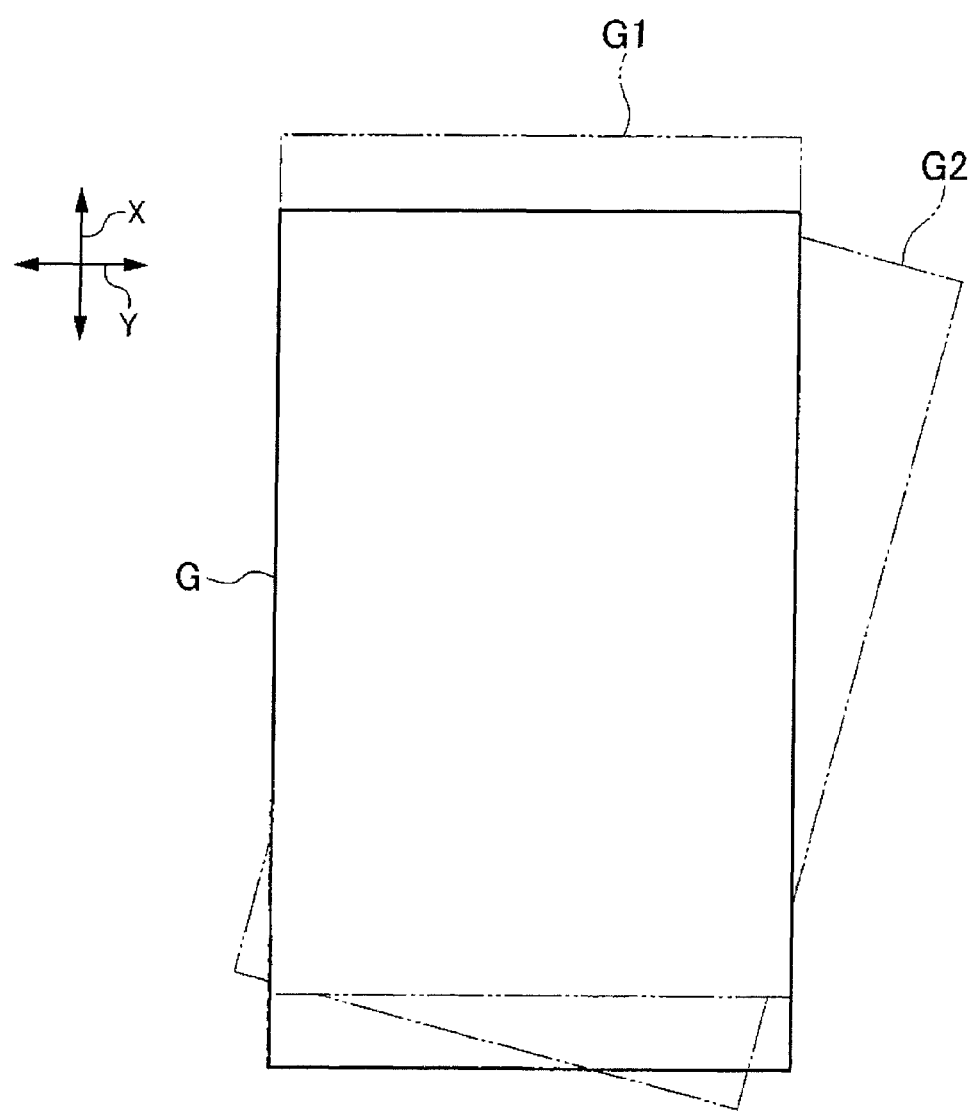
FIG. 8 is an explanatory diagram explaining a main scanning direction, a sub scanning direction, a registration shift, and a skew.

As illustrated in FIG. 8, the direction in which the document G is conveyed at the reading position of the second platen glass 43B is the sub scanning direction X (the same direction as the arrow X), and the width direction of the document G perpendicular to the conveying direction of the document G is the main scanning direction Y. The main scanning direction Y is a direction perpendicular to the drawing of paper in FIG. 3 or 4.

<Regarding Reading Unit 200>

Herein, a reading unit 200 will be described.

Figure 4:
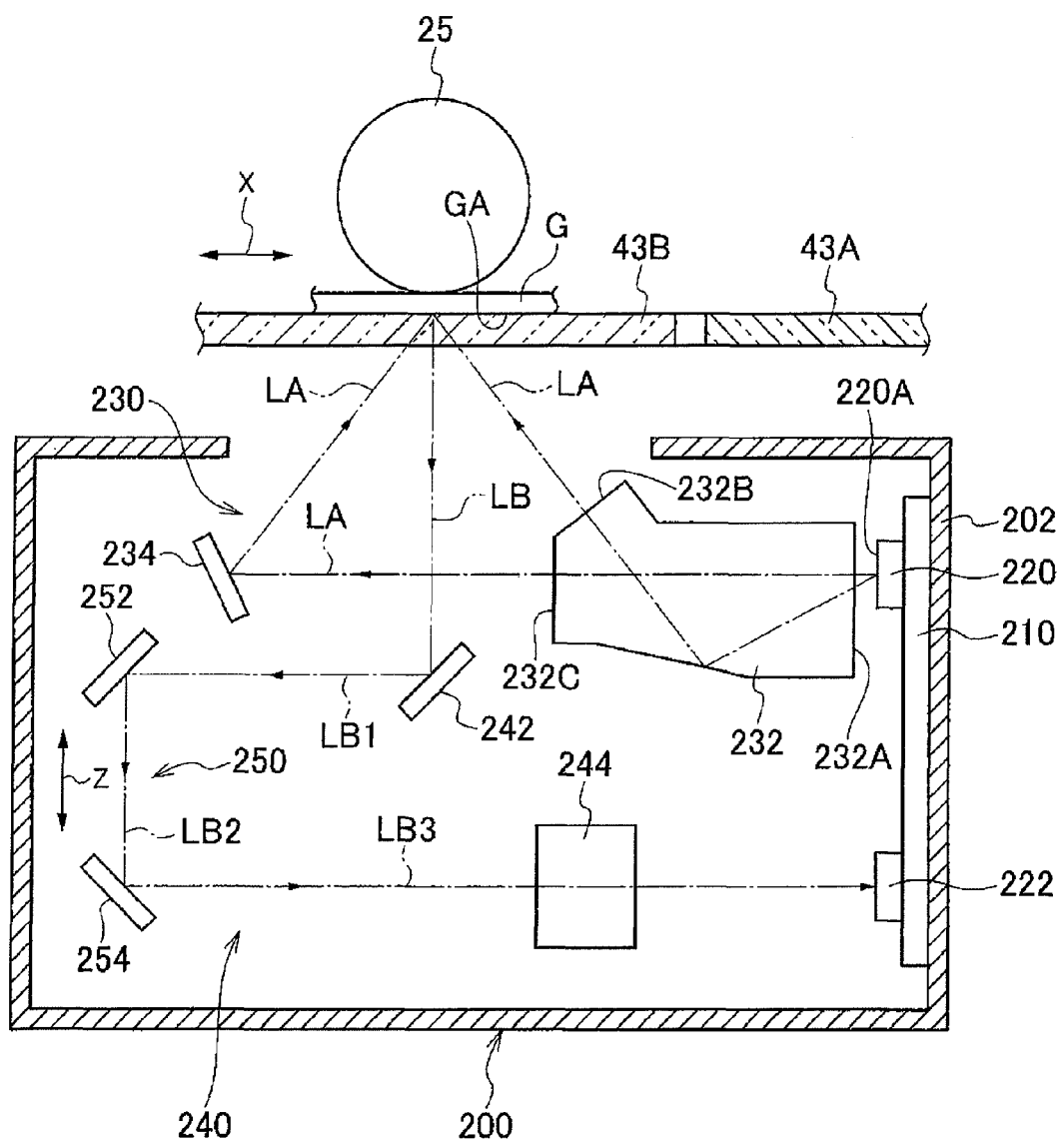
FIG. 4 is a schematic view illustrating a reading unit according to the present embodiment.

As illustrated in FIG. 4, in the reading unit 200, the substrate 210 is fixed to a case 202 so that a plate-thickness direction of the substrate 201 corresponds to the sub scanning direction. At the upper part of the substrate 210, LED (Light Emitting Diode) elements 220 as an example of a plurality of light emitting elements emitting light L which is irradiated on the document G and reflected therefrom are arranged and attached in lines at constant intervals along the main scanning direction Y (see FIG. 8). At a lower side of the LED element 220 of the substrate 210, a CCD (Charge Coupled Device) image sensor 222 as an imaging element is attached.

The entire light that is emitted from the LED element 220, irradiated on the surface to be read (image surface) GA and reflected therefrom, and incident on the image sensor 222 is the light L. For example, In FIG. 4, the light is classified as follows: the light that is emitted from the LED element 220 and irradiated on the surface to be read (image surface) GA is the irradiated light LA, and the light that is reflected from the surface to be read (image surface) GA of the document G and is incident on the image sensor 222 is the reflected light LB. The reflected light LB may be classified into the reflected lights LB1, LB2, and LB3, as will be described later.

The reading unit 200 includes a first optical system 230 configured to guide the irradiated light LA emitted from the LED element 220 such that the irradiated light LA is irradiated on the surface to be irradiated GA of the document G, and a second optical system 240 configured to guide the reflected light LB reflected from the surface to be irradiated GA toward the CCD image sensor 222.

In the first optical system 230, a light guide member 232 configured to guide the irradiated light LA is installed. The light guide member 232 is formed in an elongated shape having a longitudinal direction as the main scanning direction Y (see FIG. 8). A light incident surface 232A of the light guide member 232 is disposed to face a light exit surface 220A from which the irradiated light LA is exited, and to be in the vicinity of the light exit surface 220A.

The light guide member 232 is configured such that the irradiated light LA is incident on the light incident surface 232A, and the irradiated light LA is totally reflected in the light guide member 232 and is exited from the first light exit surface 232B and the second light exit surface 232C.

The light incident surface 232A of the light guide member 232 is larger than the light exit surface 220A of the LED element 220. When viewed in the optical axis direction of the irradiated light LA emitted by the LED element 220, it is configured such that the light exit surface 220A of the LED element 220 is within the light incident surface 232A of the light guide member 232.

The light guide member 232 is made of a material where it is difficult to attenuate an amount of light, such as, for example, an acryl resin, a polycarbonate resin, a polyimide resin, a glass, or the like.

Figure 5A:
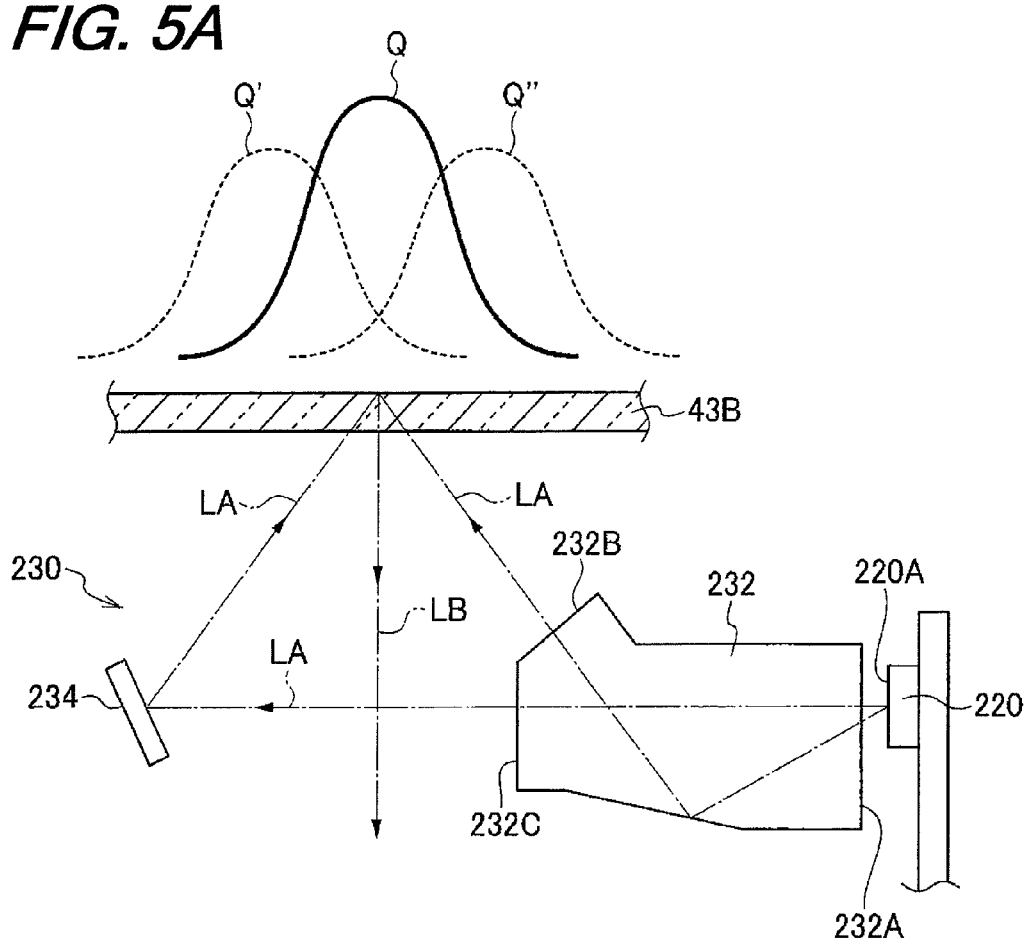
FIG. 5A is an explanatory diagram explaining a light distribution of an irradiated light of the reading unit illustrated in FIG. 4.

The irradiated light LA is emitted from the first light exit surface 232B of the light guide member 232 toward the document G. The irradiated light LA emitted from the second light exit surface 232C of the light guide member 232 is reflected toward the document G by a reflecting mirror 234. As such, the irradiated light LA is irradiated on the document G from one side of the sub scanning direction X (right side in FIG. 4) and the other side (left side in FIG. 4) of the sub scanning direction X. Therefore, as illustrated in FIG. 5A, the light distribution of the irradiated light LA irradiated to the document G in the sub scanning direction X is equal to a distribution Q.

Figure 5B:
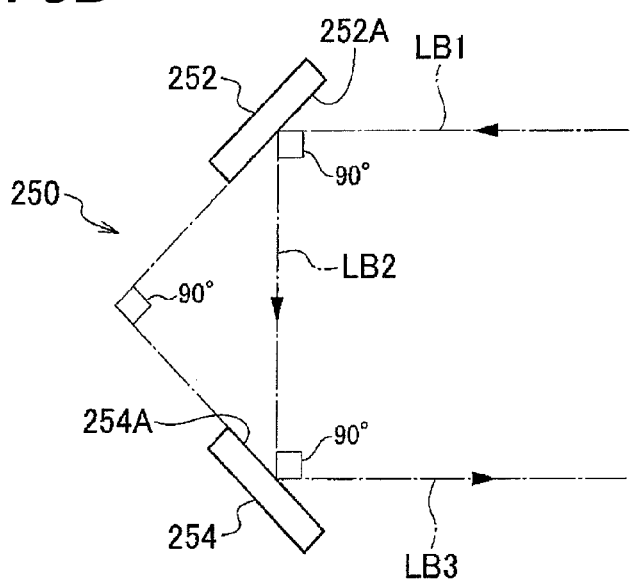
FIG. 5B is an explanatory diagram explaining a position relationship between a reflective surface of a first reflective mirror and a reflective surface of a second reflective mirror, and a position relationship of reflected light, which constitute a catoptrics system illustrated in FIG. 4.

As illustrated in FIG. 4, the second optical system 240 includes a reflecting mirror 242, a catoptrics system which includes a first reflecting mirror 252 and a second reflecting mirror 254, and an imaging lens 244. As illustrated in FIG. 5B, a reflective surface 252A of the first reflecting mirror 252 (one example of the first reflective surface) and a reflective surface 254A of the second reflecting mirror 254 (one example of the second reflective surface) are disposed to be 90°, when viewed from a lateral side (when viewed in the main scanning direction Y).

As illustrated in FIG. 4, the reflecting mirror 242 reflects the reflected light LB reflected from the surface to be read GA of the document G and exits the reflected light LB1 toward the reflective surface 252A of the first reflecting mirror 252 of the catoptrics system 250.

The first reflecting mirror 252 of the catoptrics system 250 receives the reflected light LB1 on the reflective surface 252A and exits the reflected light LB2 toward the reflective surface 254A of the second reflecting mirror 254. The second reflecting mirror 254 receives the reflected light LB2 on the reflective surface 254A and exits the reflected light LB3 toward the substrate 210.

As illustrated in FIG. 5B, the reflected light LB1 incident on the reflective surface 252A of the first reflecting mirror 252 and the reflected light LB3 reflected from the reflective surface 254A of the second reflecting mirror 254 are in parallel, and opposite to each other in a light traveling direction, when viewed from the lateral side (when viewed in the main scanning direction Y). The reflected light LB2 reflected from the reflective surface 252A of the first reflecting mirror 252 and incident on the reflective surface 254A of the second reflecting mirror 254 becomes 90° with respect to the reflected lights LB1 and LB3, when viewed from the lateral side.

As illustrated in FIG. 4, the imaging lens 244 is installed on an optical path of the reflected light LB3 between the CCD image sensor 222 and the second reflecting mirror 254, and forms an image of the reflected light LB on the CCD image sensor 222.

Figure 6:
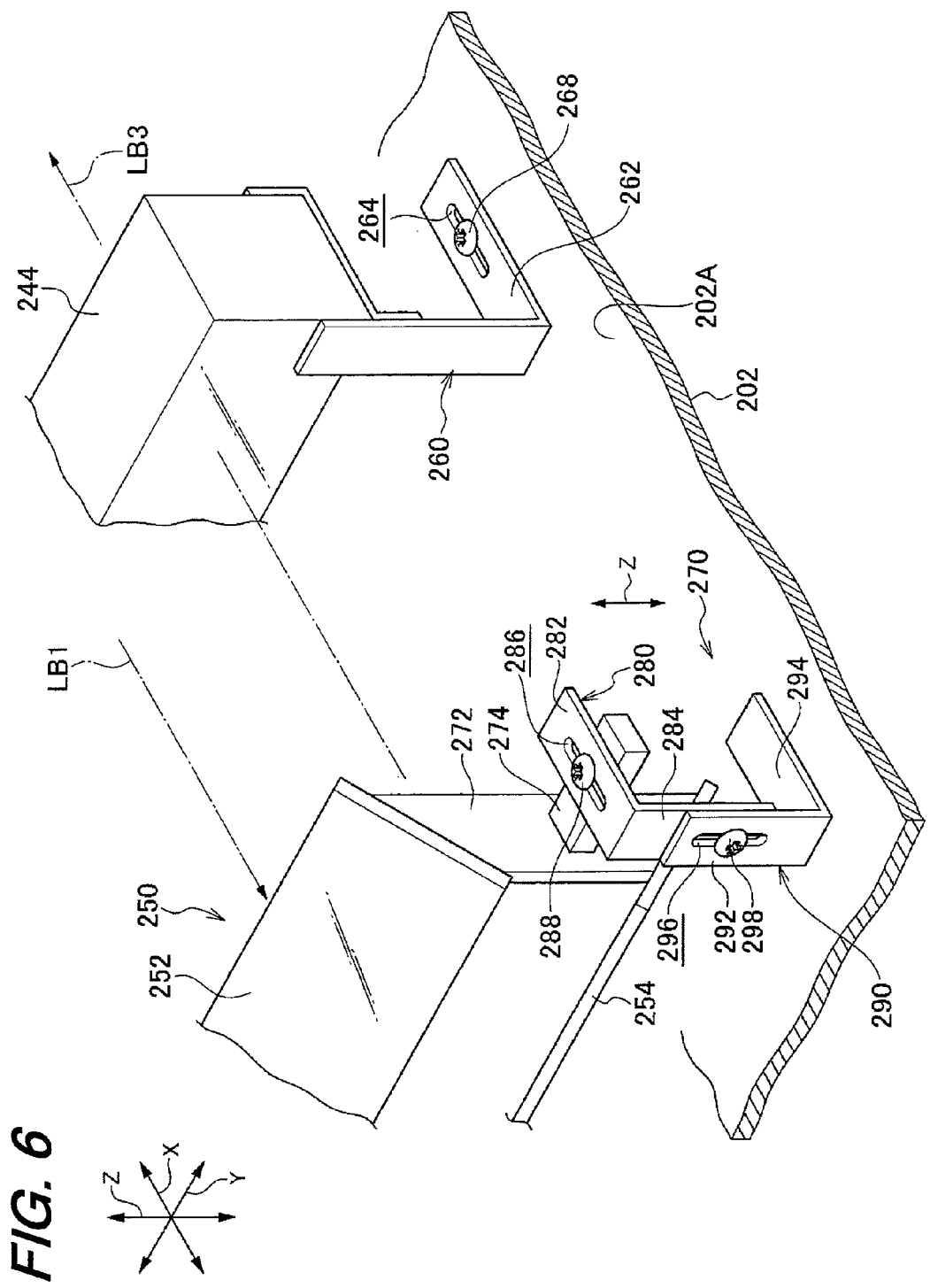
FIG. 6 is a perspective view illustrating a lens holder and a mirror holder of the reading unit illustrated in FIG. 4.

As illustrated in FIG. 6, both ends of the imaging lens 244 in the main scanning direction Y (longitudinal direction) are held in a lens holder 260 fixed to the case 202. In the lens holder 260, a fixing plate part 262 is fixed to a fixing surface 202A of the case 202 by a screw 268.

The fixing plate part 262 of the lens holder 260 and the fixing surface 202A of the case 202 are installed along the optical axis direction of the reflected light LB3. In the fixing plate part 262 of the lens holder 260, an elongated hole 264 in the longitudinal direction as the optical axis direction of the reflected light LB3 is formed. The fixing plate part 262 is fixed to the fixing surface 202A through the elongated hole 264 by the screw 268. Therefore, in a range where the screw 268 is movable in the elongated hole 264, the lens holder 260 is movably fixed to the case 202 in the optical axis direction of the reflected light LB3. That is, the imaging lens 244 is fixed by the lens holder 260 such that the position in the optical axis direction of the reflected light LB3 is adjustable.

Both ends of the first reflecting mirror 252 and the second reflecting mirror 254, which constitute the catoptrics system 250, in the respective main scanning directions Y (longitudinal directions) are fixed by the mirror holder 270, such that the positions in the optical axis directions of the reflected lights LB1 and LB3 and the position in the Z direction (optical axis direction of the reflected light LB2) perpendicular to the optical axis directions of the reflected lights LB1 and LB3 are adjustable, when viewed from the lateral side (when viewed in the main scanning direction Y).

The mirror holder 270 includes a first holding part 272, a second holding part 280, and a third holding part 290.

When viewed from the lateral side (when viewed in the main scanning direction Y), the first holding part 272 holds the first reflecting mirror 252 and the second reflecting mirror 254 such that the reflective surface 252A of the first reflecting mirror 252 and the reflective surface 254A of the second reflecting mirror 254 become 90° (see FIG. 5B). In the first holding part 272, a protrusion portion 274 that protrudes outward in the main scanning direction Y (longitudinal direction) is installed.

The second holding part 280 is configured by a plate-shaped fixing portion 282 and a plate-shaped fixing portion 284 and forms an L shape when viewed from the lateral side. Likewise, the third holding part 290 is configured by a plate-shaped fixing portion 292 and a plate-shaped fixing portion 294 and forms an L shape when viewed from the lateral side. The fixing portion 284 of the second holding part 280 and the fixing portion 294 of the third holding part 290 are fixed to the fixing surface 202A of the case 202. The fixing portion 292 of the third holding part 290 is disposed along the Z direction (optical axis direction of the reflected light LB2) perpendicular to the optical axis directions of the reflected lights LB1 and LB3.

The fixing portion 284 of the second holding part 280 is overlapped with the fixing portion 292 of the third holding part 290 and is fixed to the fixing portion 294 by the screw 298. The fixing portion 282 of the second holding part 280 is disposed along the optical axis directions of the reflected lights LB1 and LB3. In the fixing portion 282 of the second holding part 280, the protrusion portion 274 of the first holding part 272 is fixed by a screw 288.

In the fixing portion 282 of the second holding part 280, an elongated hole 286 in the longitudinal directions as the optical axis directions of the reflected lights LB1 and LB3 is formed. The protrusion portion 274 of the first holding part 272 is fixed to the fixing portion 282 through the elongated hole 286 by the screw 288. Therefore, in a range where the screw 288 is movable in the elongated hole 286, the first holding part 272 is movably fixed to the second holding part 280 in the optical axis directions of the reflected lights LB1 and LB3.

In the fixing portion 292 of the third holding part 290, an elongated hole 296 in the longitudinal direction as the Z direction perpendicular to the optical axis directions of the reflected lights LB1 and LB3 is formed. The fixing portion 284 of the second holding part 280 is fixed to the fixing portion 292 through the elongated hole 296 by a screw 298. Therefore, in a range where the screw 298 is movable in the elongated hole 296, the second holding part 280 is movably fixed to the third holding part 290 in the Z direction.

That is, the first reflecting mirror 252 and the second reflecting mirror 254 are integrated by the mirror holder 270 and are fixed such that the position in the optical axis directions of the reflected lights LB1 and LB3 and the position in the Z direction (optical axis direction of the reflected light LB2) perpendicular to the optical axis directions of the reflected lights LB1 and LB3 are adjustable, when viewed from the lateral side. Positions of the first reflecting mirror 252 and the second reflecting mirror 254 may be adjusted by each of mirror holders 270 configured to hold both ends of the first reflecting mirror 252 and the second reflecting mirror 254 in the main scanning direction Y (longitudinal direction).

<Operation and Effect>

Then, an operation and an effect of the present embodiment will be described.

As illustrated in FIG. 4, since the LED element 220 and the CCD image sensor 222 are attached on the same substrate 210, the number of substrates may be reduced and a space of the reading unit 200 may be reduced, as compared with the case where the LED element 220 and the CCD image sensor 222 are attached on the respective substrates. In the case of a comparative example in which the LED element 220 and the CCD image sensor 222 are attached to the respective substrates, it is necessary to electrically couple the substrates by a harness or the like. However, the harness or the like is unnecessary by attaching the LED element 220 and the CCD image sensor 222 on the same substrate 210. Accordingly, a process space such as the harness or the like is unnecessary, and an assembly is easy.

Herein, in a manufacturing process of the image reading module 14, the reading unit 200 constituting the image reading module 14 requires an optical adjustment, such as a focus adjustment, a magnification adjustment, a registration shift adjustment of the read image, and a skew adjustment and an inclination adjustment of the read image. Such optical adjustments may be performed by moving the position of the CCD image sensor 222, that is, by moving the substrate 210. However, if the substrate 210 is moved, the LED element 220 attached on the substrate 210 is also moved. If the LED element 220 is moved, a distance or position of the light exit surface 220A of the LED element 220 and the light incident surface 232A of the light guide member 232 is changed. Accordingly, the amount of light or the light distribution that is irradiated on the document G is changed (see the distribution Q' and the distribution Q" of FIG. 5A regard the change in the amount of light or the light distribution).

Therefore, in the present embodiment, by moving the position of the imaging lens 244 and the positions of the first reflecting mirror 252 and the second reflecting mirror 254 other than moving the substrate 210, the optical adjustment of the reflected light LB incident on the CCD image sensor 222 is performed without influencing the irradiated light LA irradiated on the surface to be irradiated GA of the document G.

Next, an example of an optical adjustment method will be described with reference to FIGS. 6 to 8.

[Focus Adjustment]

As illustrated in FIG. 6, when the screw 268 is loosened, the focus may be adjusted by moving the lens holder 260 in the optical axis direction of the reflected light LB3 and adjusting the position in the optical axis direction of the reflected light LB3 of the imaging lens 244.

[Magnification Adjustment and Inclination Adjustment]

Figure 7A:
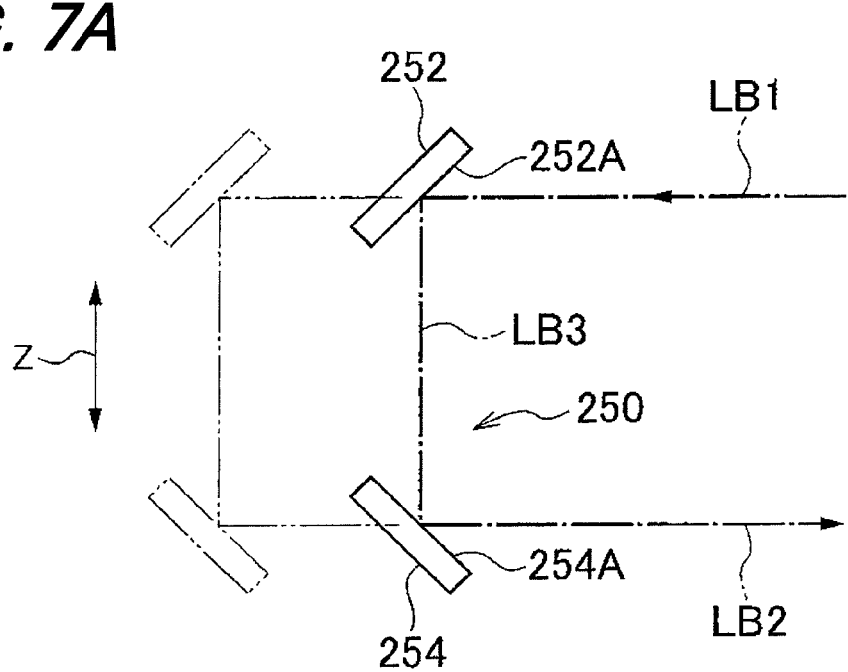
FIG. 7A is an explanatory diagram explaining a position adjustment of an optical axis direction of reflected light LB1 and LB3 in the first reflective mirror and the second reflective mirror.

As illustrated in FIG. 6, when the screw 288 is loosened, the first holding parts 272 of both of the mirror holders 270 that hold the ends of the first reflecting mirror 252 and the second reflecting mirror 254 are moved by the same distance in the optical axis directions of the reflected lights LB1 and LB3. Therefore, as illustrated in FIG. 7A, the length of the optical path is changed and thus the magnification is adjusted. The inclination may be adjusted by changing the movement amount of the first holding parts 272 by the two mirror holders 270 or by moving the first holding parts 272 in the opposite directions.

[Registration Shift Adjustment and Skew Adjustment]

Figure 7B:
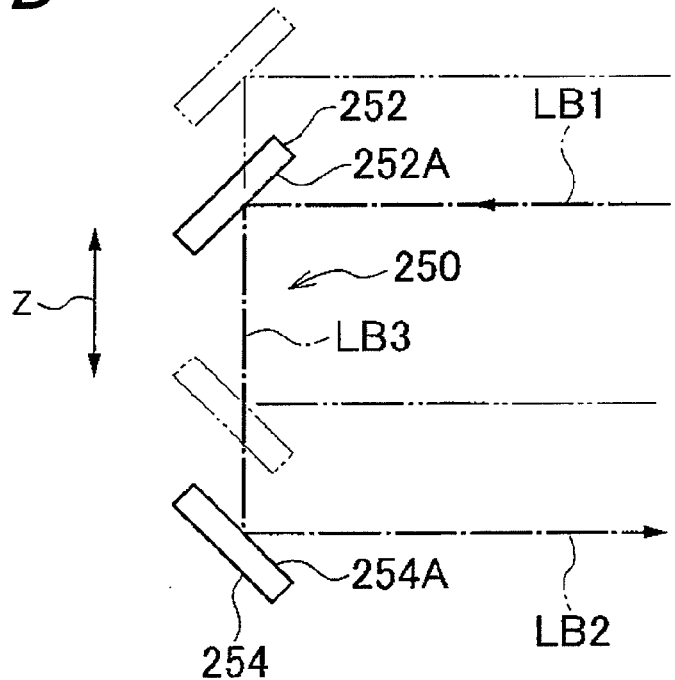
FIG. 7B is an explanatory diagram explaining a position adjustment of a Z direction perpendicular to the optical axes of reflected light LB1 and LB3 in the first reflective mirror and the second reflective mirror.

As illustrated in FIG. 6, when the screw 298 is loosened, the second holding parts 280 of the two mirror holders 270 are moved by the same distance in the Z direction (optical axis direction of the reflected light LB2) perpendicular to the optical axis directions of the reflected lights LB1 and LB3. Therefore, as illustrated in FIG. 7B, the position in the Z direction may be changed and thus the registration shift may be adjusted. The skew may be adjusted by changing the movement amount of the second holding parts 280 by the two mirror holders 270 or by moving the second holding parts 280 in the opposite directions.

The "registration shift adjustment" is an adjustment of the position in the sub scanning direction such as G1 illustrated in FIG. 8, and the "skew adjustment" is an adjustment of the inclination with respect to the sub scanning direction such as G2 illustrated in FIG. 8.

When the respective optical adjustments are completed, the lens holder 260 and the mirror holder 270 are respectively fixed by coupling the screws 268, 288 and 298.

Since the first reflecting mirror 252 and the second reflecting mirror 254 can be adjusted by moving in such a state that the reflective surface 252A and the reflective surface 254A are maintained at an angle of 90°, the optical adjustment is easy as compared with the configuration that separately moves the first reflecting mirror 252 and the second reflecting mirror 254.

The light incident surface 232A of the light guide member 232 is larger than the light exit surface 220A of the LED element 220, and it is configured such that the light exit surface 220A of the LED element 220 is received in the light incident surface 232A of the light guide member 232, when viewed in the optical axis direction of the irradiated light LA emitted by the LED element 220. Therefore, the change in the amount of incident light is suppressed with respect to the position change according to an attachment tolerance of the LED element 220 or the substrate 210, or the like.

<Others>

The present invention is not limited to the above-described embodiments.

For example, in the above-described embodiments, although the positions are adjusted and fixed by the elongated holes 264, 286 and 296 and the screws 268, 288 and 298, the invention is not limited thereto. For example, instead of the elongated holes or the screws, after the positions are adjusted, the lens holder 260 and the mirror holder 270 may be fixed by a photo-curable adhesive, or the like, which is cured using light such as UV, or the like. The lens holder 260 and the mirror holder 270 are exemplary and are not limited thereto. Any configuration or mechanism may be possible as long as it performs an optical adjustment by moving the position of the imaging lens 244, the first reflecting mirror 252 and the second reflecting mirror 254, and fixes the positions.

For example, in the above-described embodiments, although the first reflecting mirror 252 and the second reflecting mirror 254 are configured to be integrated and moved while the first reflecting mirror 252 and the second reflecting mirror 254 are maintained at 90°, the invention is not limited thereto. The first reflecting mirror 252 and the second reflecting mirror 254 may be configured to separately adjust the positions thereof.

In the above-described embodiments, although the LED (Light Emitting Diode) element 220 is used as the light emitting element, the invention is not limited thereto. Other light emitting elements, such as an organic EL (Electro Luminescence) element or an inorganic EL element, may be used.

In the above-described embodiments, although the CCD (Charge Coupled Device) image sensor 222 is used as the imaging element, the invention is not limited thereto. Other imaging elements such as, for example, CMOS (Complementary Metal Oxide Semiconductor) image sensor may be used.

Various embodiments may be made without departing from the gist of the present invention.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a substrate;
   a plurality of light emitting elements that is arranged on the substrate in a line and emits light to a surface of an object to be irradiated;
   an imaging element that is disposed on the substrate and receives light reflected from the surface of the object;
   a first optical system that guides the light emitted from the plurality of light emitting elements to the surface of the object;
   a second optical system that guides the light reflected from the surface to the imaging element, the second optical system including:
   a catoptrics system that includes a first reflective surface on which the light reflected from the surface is incident and a second reflective surface disposed to be 90° with respect to the first reflective surface so that light reflected from the first reflective surface is reflected to the substrate; and
   an imaging lens disposed on an optical path between the imaging element and the second reflective surface and configured to form an image of light on the imaging element;
   a lens position fixing unit that is configured to adjust a position of the imaging lens in an optical axis direction of the imaging lens and fixes the imaging lens; and
   a reflective surface fixing unit that is configured to adjust a position of the second reflective surface in an optical axis direction of light reflected from the second reflective surface and in an optical axis direction of light incident on the second reflective surface and fixes the reflective surface.

2. The image reading apparatus according to claim 1, wherein the reflective surface fixing module adjusts the position of the second reflective surface while maintaining a relative positional relationship between the first reflective surface and the second reflective surface.

3. The image reading apparatus according to claim 1 further comprising a holding part that holds the first reflective surface and the second reflective surface so that a relative angle between the first reflective surface and the second reflective surface is kept at an angle of 90 degrees.

4. The image reading apparatus according to claim 1, wherein the light emitting elements and the imaging elements are disposed on the same surface of the substrate.

5. The image reading apparatus according to claim 1, wherein the plurality of light emitting elements emits the light in a direction parallel to a direction of the light reflected from the second reflective surface to the substrate.

6. The image reading apparatus according to claim 1, further comprising:
   a reading unit which comprises the substrate, the plurality of light emitting elements, the imaging element, the first optical system, the second optical system, the catoptrics system, the imaging lens, the lens position fixing unit, and the reflective surface fixing unit,
   wherein the reading unit is movable in a direction of the light reflected from the second reflective surface to the substrate.

7. The image reading apparatus according to claim 6, wherein the lens position fixing unit is configured to adjust the position of the imaging lens independently of the reflective surface fixing unit adjusting the position of the second reflective surface.

8. The image reading apparatus according to claim 1, wherein the reflective surface fixing unit is configured to adjust a position of the second reflective surface in the optical axis direction of the light reflected from the second reflective surface independently of a position of the second reflective surface in the optical axis direction of the light incident on the second reflective surface.

9. An image reading apparatus comprising:
   a substrate;
   a plurality of light emitting elements that is arranged on the substrate in a line and emits light to a surface of an object to be irradiated;
   an imaging element that is disposed on the substrate and receives light reflected from the surface of the object;
   an optical system that guides the light reflected from the surface to the imaging element, the optical system including:
   a catoptrics system that includes a first reflective surface on which the light reflected from the surface is incident and a second reflective surface disposed so that light reflected from the first reflective surface is reflected to the substrate; and
   a reflective surface fixing unit that is configured to adjust a position of the second reflective surface in an optical axis direction of light reflected from the second reflective surface and in an optical axis direction of light incident on the second reflective surface and fixes the reflective surface.

10. The image reading apparatus according to claim 9, wherein the reflective surface fixing unit is configured to adjust a position of the second reflective surface in the optical axis direction of the light reflected from the second reflective surface independently of a position of the second reflective surface in the optical axis direction of the light incident on the second reflective surface.

* * * * *